C. H. WILLCOX.

SEWING-MACHINE.

No. 7,213. Reissued July 4, 1876.

*Witnesses.*

A. A. Seaman

Frank B. Groff

*Inventor.*

Chas. H. Willcox by atty's Poole & Bailey

N. PETERS, PHOTO-LITHOGRAPHER, WASHINGTON, D. C.

UNITED STATES PATENT OFFICE.

CHARLES H. WILLCOX, OF NEW YORK, N. Y., ASSIGNOR, BY MESNE ASSIGNMENTS, TO THE WILLCOX & GIBBS SEWING MACHINE COMPANY.

IMPROVEMENT IN SEWING-MACHINES.

Specification forming part of Letters Patent No. 44,491, dated September 27, 1864; reissue No. 7,213, dated July 4, 1876; application filed May 3, 1876.

*To all whom it may concern:*

Be it known that I, CHARLES H. WILLCOX, of the city, county, and State of New York, have invented certain new and useful Improvements in Sewing-Machines; and I do hereby declare that the following is a full, clear, and exact description of the same, reference being had to the accompanying drawings, in which—

Figure 1:
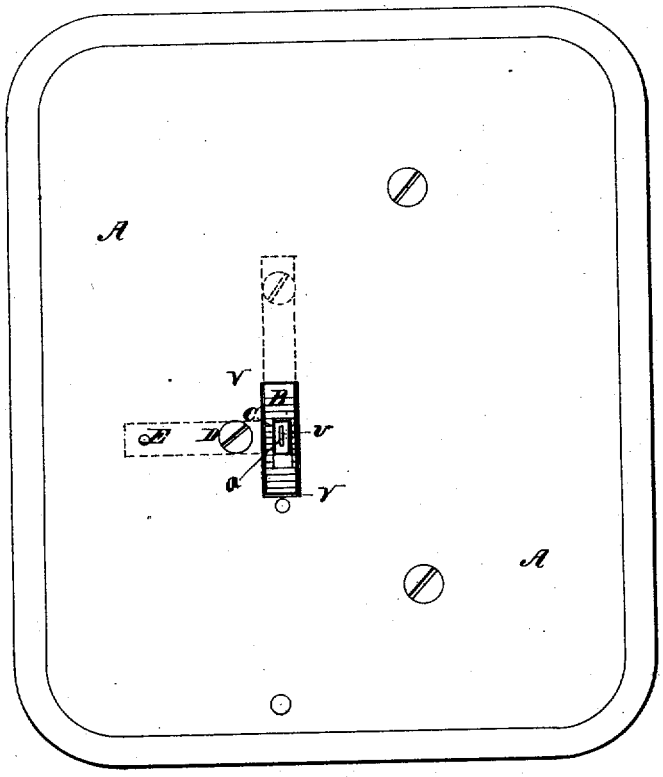
Figure 2:
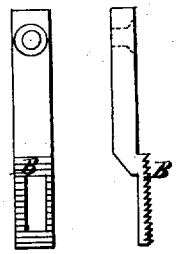
Figure 3:
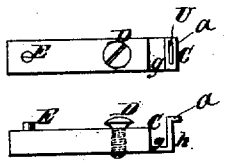

Figure 1 represents a plan of the cloth-plate of a sewing-machine with the present improvement applied thereto; Fig. 2, a plan and side view of the improved feed-bar detached; Fig. 3, a plan and side view of the improved "needle-hole piece" detached.

This invention relates to sewing-machines having a feed known as the four-motion feed, which is an "under feed," so called—that is to say, a feed-surface arranged to work up through the cloth-plate.

Most arrangements of feed-surface and needle-hole heretofore constructed are found to be more or less defective, since, under some circumstances, owing to part of the foot or presser covering portions of the cloth-plate, through which no feeding device projects, seams or other suddenly-increased thickness of material cannot, without assistance, be fed through the machine. The difficulty in the way of encompassing the needle-hole in the cloth-plate with a four-motion feed-surface has been the apparent impossibility of supporting that portion of the cloth-plate in which the needle-hole is made without leaving a break in the feed-surface on one or more sides of the needle-hole, where the same is connected with the rest of the cloth-plate.

The novel arrangement which is the subject of this invention obviates these difficulties, and permits the feed-surface to entirely encompass the needle-hole, which is in a separate piece, fastened to the under side of the cloth-plate, and projects upward through a hole in the cloth-plate, and through a hole in the center of the feed-surface, flush with the upper side of such plate. This needle-hole piece also furnishes a stationary surface, intermediate between the feed-surfaces and the needle-hole, to support the goods around or in the vicinity of the needle-hole. It also acts as a guard to prevent the loop being thrown out from the wrong side of the needle for the looper or hook to enter. Pieces having different sizes of needle-holes can be readily substituted, according to the kind of work to be performed. The needle-hole pieces can be made of steel, and hardened, and thereby rendered much more durable than heretofore.

My invention therefore consists of a needle-hole piece, made of a separate piece of metal, secured to the cloth-plate, and formed so as to admit of a four-motion under-feed surface, acting simultaneously on all four sides of the needle, and so as to insure the proper presentation of the loop to the looper, and thus facilitate the entrance of the looper therein.

My invention also consists of the four-motion flat under-feed surface, constructed and operating on all four sides of the needle-hole, in combination with a flat cloth-supporting surface and a presser-foot having an under surface smooth, flat, or parallel with the cloth-plate; and it further consists in the combination, with the members of the foregoing specified combination, of a stationary goods-supporting surface, intermediate between the feed-surface and the needle-hole.

It will be found advantageous to make the needle-hole piece of hardened steel, and to render it readily removable from the machine, so that it may be changed and replaced with facility.

As these improvements may be readily applied with slight alteration to any single or double thread machine using a four-motion feed, I will only show the manner in which they may be applied to that known as the Willcox & Gibbs sewing-machine.

In the said drawings A is the cloth-plate, in which is made an oblong slot or hole, V, and through this slot works the feed-surface B. Through a hole in the center of the feed-surface projects the needle-hole piece C, which is fastened onto the under side of the plate by the screw D, and adjusted to its proper position by the pin E. It has the needle-hole U and the slot or groove *g*, Fig. 3, made in it to permit the proper movement of the feed surface B, which, it will be perceived, operates on four sides of the needle-hole. The upper face *a* of the piece C, immediately around the needle-hole, constitutes the stationary goods-supporting surface intermediate between the needle-hole and the feed-surfaces. The surface *h* of the needle-hole piece, close to which the needle passes, acts so as to throw the loop to the proper side of the needle to be caught by the looper.

Having now described my invention, and the manner in which the same is or may be carried into effect, I shall state my claims as follows:

In sewing-machines having a feed known as the four-motion-feed, I claim—

1. The needle-hole piece, formed of a separate piece of metal, secured to the cloth-plate, as hereinbefore described, and constructed and arranged in relation to the needle-path substantially as described, whereby the loop is thrown out on the side of the needle in the path of the looper or stitch-forming device.

2. In combination with a flat cloth-supporting surface, and acting against a presser-foot having an under surface smooth, flat, or paralel with the cloth-plate, a flat four-motion under-feed surface, constructed and operating in conjunction with the latter on all four sides of the needle-hole in said cloth-plate, substantially as described.

3. The combination of the flat four-motion feed-surface, operating on all four sides of the needle-hole, and against a presser-foot having an under surface smooth, flat, or parallel with the cloth-plate, as described, with a stationary goods-supporting surface intermediate between the feed-surface and the needle-hole, substantially as described.

In testimony whereof I have hereunto signed my name this 28th day of April, A. D. 1876.

CHAS. H. WILLCOX.

Witnesses:
A. POLLOK,
W. H. C. LEE.